Jan. 11, 1944.   G. G. BROWN ET AL   2,339,049
CONTROL DEVICE
Filed Feb. 23, 1943   2 Sheets-Sheet 1

Inventors
Gerald G. Brown
James W. Haupt
By Bacon + Thomas
Attorneys

Jan. 11, 1944.   G. G. BROWN ET AL   2,339,049
CONTROL DEVICE
Filed Feb. 23, 1943   2 Sheets-Sheet 2

Inventors
Gerald G. Brown
James W. Haupt

Bacon & Thomas
Attorneys

Patented Jan. 11, 1944

2,339,049

UNITED STATES PATENT OFFICE 2,339,049

CONTROL DEVICE

Gerald G. Brown and James W. Haupt, Wichita, Kans., assignors to Cardwell Manufacturing Company, Inc., Wichita, Kans., a corporation of Kansas Application February 23, 1943, Serial No. 476,868

5 Claims. (Cl. 74—53)

This invention relates to a control device and more particularly to a control device for independently or simultaneously moving a plurality of controlled members.

The invention is particularly applicable to the control of fuel valves such as the throttle valves of a plurality of internal combustion engines although the principles of the invention may be applied to other devices where it is desired to move a plurality of controlled members, either individually or simultaneously. A portion of the apparatus may be advantageously employed for the accurate control of a single controlled member although the invention finds its chief utility in structures having a plurality of devices to be controlled.

An object of the present invention is to provide an improved control device by which a plurality of controlled members may be individually or simultaneously moved to a desired extent.

Another object of the invention is to provide an improved control device capable of being employed for remotely controlling the fuel valves of internal combustion engines.

Another object of the invention is to provide an improved control device providing for gradual accurate movement of a controlled member as well as for rapid actuation of said controlled device.

A further object of the invention is to provide an improved control device particularly applicable for controlling the throttle valves of a plurality of internal combustion engines whereby said engines may be controlled in synchronism or individually controlled.

A still further object of the invention is to provide an improved hydraulic control system for the fuel valves of a plurality of internal combustion engines whereby said throttle valves may be individually or simultaneously set at a desired position from a remote point.

Other objects and advantages of the invention will appear in the following description of a preferred embodiment of the invention illustrated in the attached drawings of which:

Figure 1:
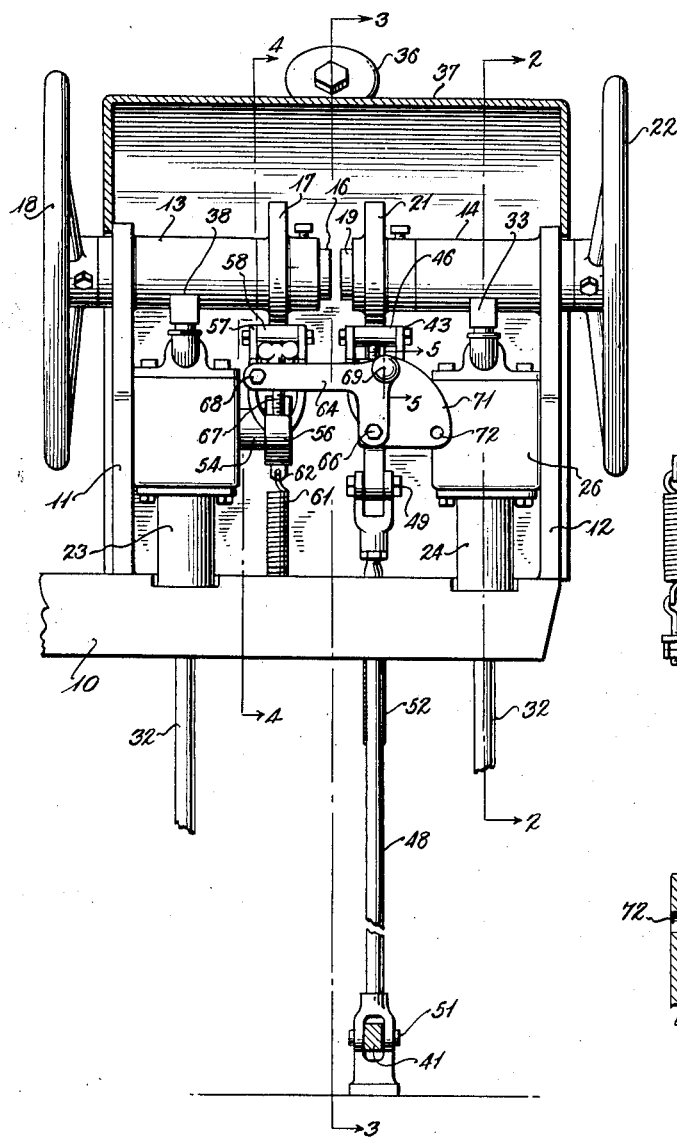
Fig. 1 is a front elevation of a portion of the control device shown with the casing thereof in section.

Referring more particularly to Fig. 1 of the drawings, the control device of the present invention includes a frame 10 having a pair of spaced upstanding standards 11 and 12 provided with inwardly extending bearing members 13 and 14, respectively. The bearing member 13 receives a cam shaft 16 upon the inner end of which is secured a cam 17 and upon the other end of which is secured a hand wheel 18. Similarly, the bearing member 14 receives a shaft 19 upon the inner end of which is secured a cam 21 and upon the other end of which is rigidly secured a hand wheel 22. It will be apparent that rotation of the hand wheel 18 rotates the cam 17 and that rotation of the wheel 22 rotates the cam 21.

Figure 3:
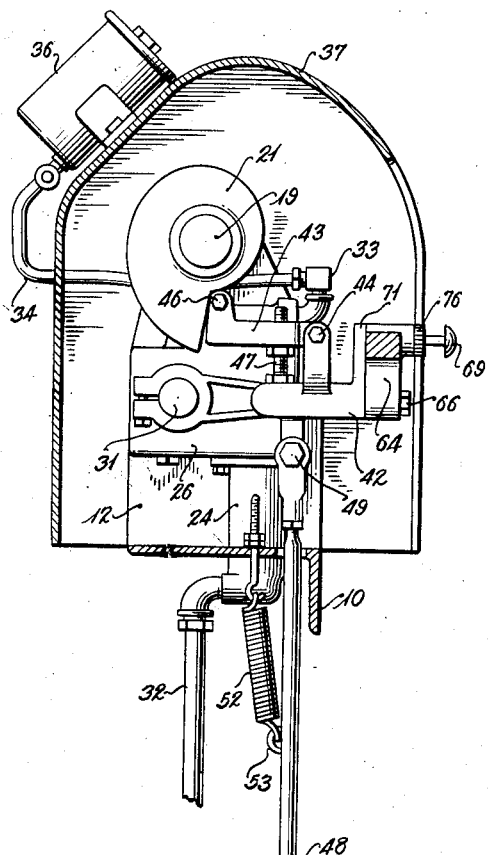
Fig. 3 is a vertical section taken on the line 3—3 of Fig. 1.
Figure 2:
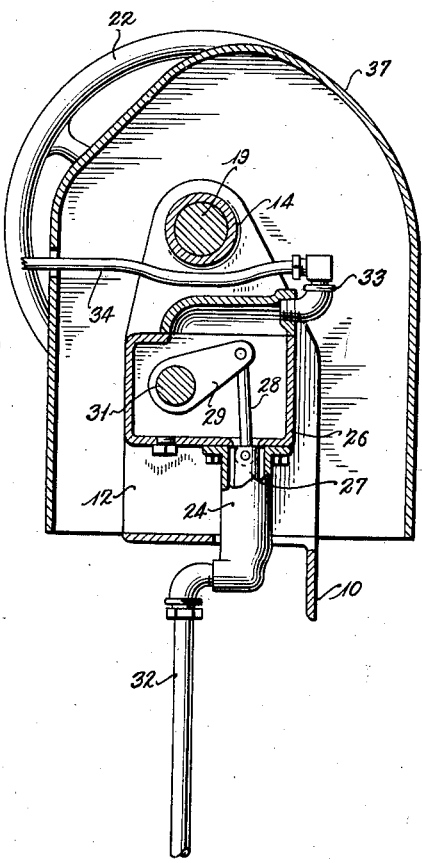
Fig. 2 is a vertical section taken on the line 2—2 of Fig. 1.

The cams 17 and 21 actuate pistons in hydraulic master cylinders 23 and 24, respectively, suitably secured to the standards 11 and 12. A portion of the internal structure of the master cylinder 24 actuating means is shown in Fig. 2 and since the two master cylinders and actuating means are identical in structure only one will be described. As shown in Fig. 2 the master cylinder 24 is secured to a crankcase 26 and receives a piston 27 actuated by a link 28 pivoted to a crank 29 secured to a shaft 31 extending externally through a side of the crankcase 26 as shown in Fig. 3. The structure of the piston 27 and internal structure of the cylinder 24 is not shown in detail as any known or suitable type of hydraulic master cylinder assembly may be employed. It is sufficient to state that rotation of the shaft 31 in a clockwise direction in Fig. 2 depresses the piston 27 into the cylinder 24 to force hydraulic fluid under pressure through a tube 32.

The crankcase 26 for the cylinder 24 is maintained full of hydraulic fluid by means of an inlet connection 33 and a tube 34, connecting the casing 26 with a reservoir 36 (Fig. 3) secured to a cover 37 for the control mechanism. The reservoir may be similarly connected to an inlet connection 38 of the crankcase of the other hydraulic cylinder 23 by a tube (not shown). As well known in the art of hydraulic control mechanisms, suitable ports and valves (not shown) are provided for permitting fluid to flow from the crankcase 26 of the hydraulic cylinder into the hydraulic cylinder when the piston 27 is in its uppermost position as in Fig. 2.

The mechanism for rotating the shaft 31 either from the cam 21 or from the accelerator pedal 41 is more clearly shown in Fig. 3. As shown in this figure, a lever arm 42 is secured to the shaft 31 and has a cam follower arm 43 pivoted thereto at 44 intermediate the ends of the lever arm 42. The cam follower arm 43 carries a roller 46, more clearly shown in Fig. 1, which engages the cam 21. The cam follower arm 43 extends generally backward toward the shaft 31 and is held in spaced relation to the lever arm 42 by means of an adjusting screw 47. It will be apparent that rotation of the cam 21 clockwise in Fig. 3 will cause movement of the lever arm 42 clockwise about the shaft 31 thus rotating the crank 29 (Fig. 2) to depress the piston 27 and force hydraulic fluid under pressure out of the piston 24 through the tube 32. It will be further apparent that the position of the lever arm 42 and thus the crank 29 may be adjusted with respect to the cam 21 by means of the adjusting screw 47.

The lever arm 42 may be actuated independently of the cam 21 by the foot pedal 41. Thus the foot pedal 41 may be connected to the lever arm 42 by means of a link 48 pivoted to the lever arm 42 at 49 and to the foot pedal at 51. A tension spring 52 extending between the frame 10 and an attaching member 53 secured to the link 48 may be employed to return the link 48 after depression of the foot pedal 41 and also urge the lever arm 42 in a counterclockwise direction to hold the cam follower roller 46 against the cam 21.

Figure 4:
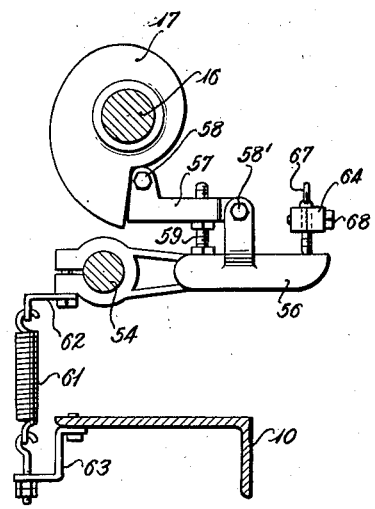
Fig. 4 is a fragmentary vertical section taken on the line 4—4 of Fig. 1.

As shown in Fig. 4 the shaft 54 actuating the piston in the cylinder 23 may be operated from the cam 17 in a manner essentially similar to the operation of the shaft 31 from the cam 21. Thus the shaft 54 has a lever arm 56 secured thereto to which is pivoted a cam follower arm 57 provided with a cam follower roller 58 (Fig. 1) for engagement with the cam 17. The cam follower arm 57 (Fig. 4) is pivoted to the lever arm 56 at 58' and is provided with an adjusting screw 59 for adjusting the position of the lever arm 56 with respect to the cam 17. Rotation of the cam 17 in a clockwise direction in Fig. 4 rotates the lever arm 56 and the shaft 54 in a clockwise direction and a spring 61 extending between a bracket 62 on the lever arm 56 and a bracket 63 secured to the frame 10 urges the lever arm 56 in a counter-clockwise direction to maintain the cam follower roller 58 against the cam 17.

Figure 5:
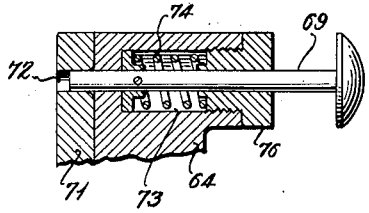
Fig. 5 is a fragmentary sectional view on an enlarged scale of a spring detent taken on the line 5—5 of Fig. 1.

Provision is made for selectively connecting the two lever arms 42 and 56 together for simultaneous operation by either the hand wheel 22 or the accelerator pedal 41. A connecting arm 64 (Figs. 1, 3 and 4) is pivoted at 66 to the end of the lever arm 42 for clockwise rotation in Fig. 1 from the position shown. The lever arm 64 is provided adjacent its left end in Fig. 1 with an adjusting thumb screw 67 positioned to engage the upper surface of the lever arm 56 as also shown in Fig. 4. A clamping screw 68 is provided for maintaining the adjusting screw 67 in adjusted position. In the position of the lever arm 64 shown in the drawings it will be apparent that movement of the lever arm 42 about the shaft 31 in a clockwise direction in Fig. 3 also causes rotation of the lever arm 56 in a clockwise direction in Fig. 4 due to the connection between these lever arms provided by a lever arm 64. The lever arm 64 is held in the position shown in the drawings by means of a spring detent member 69 the details of which are shown more clearly in Fig. 5. The lever arm 42 terminates in a detent plate 71 having apertures 72 therein for receiving spring detent member 69 which is carried by the lever arm 64. The spring detent member 69 is urged toward the plate 71 by means of a compression spring 73 contained in a bore 74 in the lever arm 64 and retained in position by means of a plug 76. By withdrawing the spring detent member 69 the lever arm 64 may be rotated about its pivot 66 in a clockwise direction in Fig. 1 to carry the adjusting screw 67 out of contact with the lever arm 56. The lever arm 64 may be retained in inactive position by engagement of the spring detent 69 with another aperture 72 in the detent plate 71.

Figure 6:
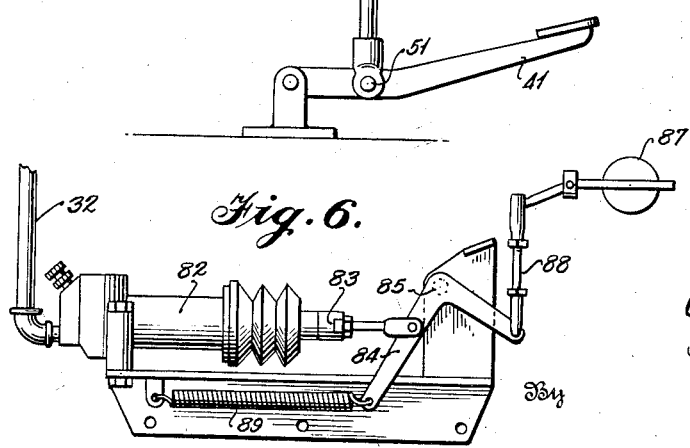
Fig. 6 is a side elevation of another portion of the control device.

Each of the master hydraulic cylinders 23 and 24 may be connected by a tube 32 to an actuating or slave cylinder 82 shown in Fig. 6. Since each of the actuating cylinders may be identical, only one will be described and since any known or suitable actuating cylinder may be employed, the structure thereof will not be given in detail. It is sufficient to state that fluid under pressure entering the cylinder 82 through the tube 32 causes the piston rod 83 to be moved to the right in Fig. 6 so as to rotate a bell crank 84 about a pivot 85 and thus actuate a throttle valve 87 through a link 88. A spring 89 may be employed to return the bell crank 84 and piston rod 83 to the left, thus returning fluid to the corresponding master cylinder from tube 32 upon release of pressure from the master cylinder.

The cams 21 and 17 preferably have a configuration which produces uniform rotation of the cam follower assembly including the lever arms 54 and 42, respectively, upon uniform rotation of the hand wheels 18 and 22, respectively. Furthermore, the angle of the cam surface at any point with respect to a line normal to the radius of the cam at said point is preferably smaller than the friction angle so that the cams and hand wheels will remain in adjusted position at any desired point. In any event this relation should be satisfied or sufficient friction should be present in the cam rotating mechanism so that the hand wheel and cams will remain in adjusted position at any desired point.

It will be apparent from the above description that when the interlocking lever arm is in inactive position each of the hand wheels 18 and 22 may be employed to individually control their corresponding throttle valves or other controlled elements. In this position of the lever arm 64 the accelerator pedal 41 is effective to control only the throttle valve or other control element actuated from the lever arm 42. When the lever arm 64 is in the position shown in the drawings, both of the controlled elements may be controlled simultaneously and in synchronism from the hand wheel 22. Also the accelerator pedal 41 is effective to effect simultaneous control. The hand wheels 18 and 22 are employed for fine adjustment of the controlled elements and maintain such adjustment until manually released whereas the accelerator pedal 41 is available for rapid acceleration or rapid movement of the control element and release thereof. It will be apparent that an accelerator pedal such as that shown at 41 may also be provided for individual control of the lever arm 56 and that by suitable concentric shaft arrangements, more than two cams 17 and 19 and associated cam followers, may be positioned closely adjacent each other and selectively interlocked so that any combination of controlled elements may be moved simultaneously as well as individually. It is further apparent that mechanical connections between the controlled mechanism and the control mechanism may be employed instead of hydraulic connections and that the present invention is applicable to control elements other than throttle or fuel valves.

Applicants have disclosed a preferred embodiment of their invention, but it is understood that the details thereof may be varied within the scope of the following claims:

We claim:

1. In a control device for a plurality of controlled elements, a plurality of aligned cam shafts, a plurality of control cams each secured to one of said shafts, a cam follower for each of said cams, connections between each of said cam followers and a controlled element for varying the position of said element by movement of the corresponding cam follower, separate hand wheels for each of said cams each secured to one of said shafts for causing movement of the corresponding cam follower to independently control said controlled elements, and a releasable connection extending between said cam followers for simultaneously controlling said controlled elements from one of said hand wheels.

2. In a control device for a plurality of controlled elements, a plurality of aligned cam shafts, a plurality of control cams each secured to one of said shafts, a cam follower for each of said cams, connections between each of said cam followers and a controlled element for varying the position of said element by movement of the corresponding cam follower, a manual actuating means for each of said cams each secured to one of said shafts for causing movement of the corresponding cam follower to separately control said controlled elements and means for connecting said cam followers together for simultaneously controlling said elements by one of said actuating means.

3. In a control device for controlling a plurality of controlled elements, a plurality of control cams, a cam follower for each of said cams, connections between each of said cam followers and a corresponding controlled element for varying the position of said controlled elements upon movement of the corresponding cam follower, separate actuating means for each of said cams for causing movement of the corresponding cam follower to separately control said controlled elements and means for connecting said cam followers together for simultaneously controlling said controlled elements by one of said actuating means.

4. In a control device for controlling a plurality of controlled elements, a plurality of control cams, a cam follower for each of said cams, connections between each of said cam followers and a corresponding controlled element for varying the position of said controlled elements upon movement of the corresponding cam follower, separate actuating means for each of said cams for causing movement of the corresponding cam follower to separately control said controlled elements, means for releasably connecting said cam followers together for simultaneously controlling said controlled elements by one of said actuating means and separate means for moving said cam followers independently of said actuating means.

5. In a control device for controlling a plurality of controlled elements, a plurality of aligned cam shafts, a plurality of rotary control cams each secured to one of said shafts, a cam follower for each of said cams each of said cam followers comprising a main lever arm mounted on a pivot spaced from said shafts, a supplemental lever arm pivoted on said main lever arm, said supplemental lever arm having a cam engaging portion, and adjusting means for varying the position of said supplemental lever arm with respect to said main lever arm, connections between each of said main lever arms and a corresponding controlled element for varying the position of said controlled elements upon movement of the corresponding cam follower, separate hand wheels for each of said cams each secured to one of said shafts for causing movement of the corresponding cam follower and means for releasably connecting said cam followers together for simultaneously varying the positions of said controlled elements by one of said hand wheels.

GERALD G. BROWN.
JAMES W. HAUPT.